April 17, 1962     I. L. RUIZ     3,029,546
MULTI-PURPOSE FISH TRAP
Filed April 5, 1960
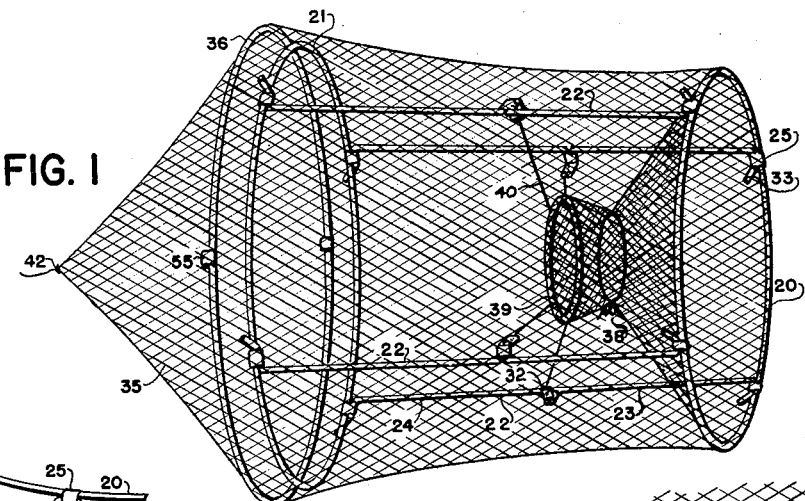
FIG. 1
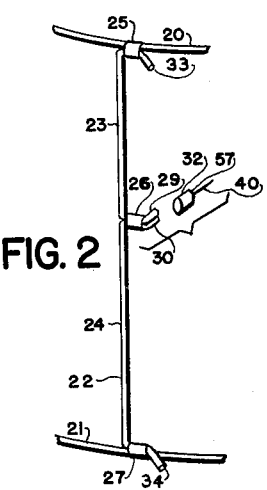
FIG. 2
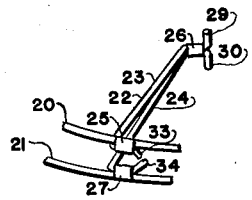
FIG. 3
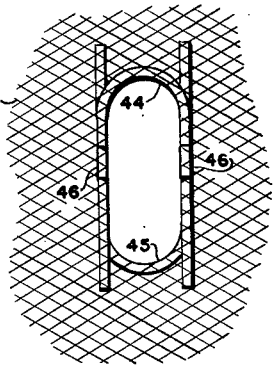
FIG. 4
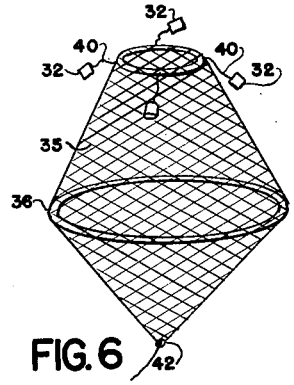
FIG. 6
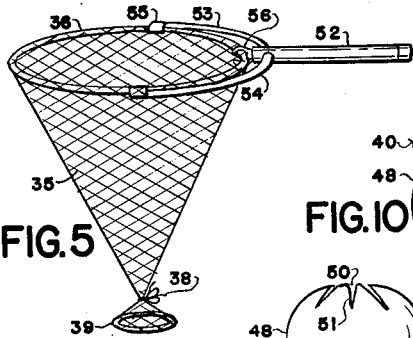
FIG. 5
FIG. 10
FIG. 9
FIG. 11
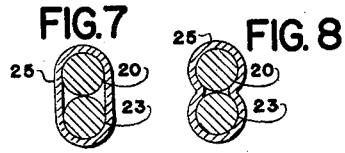
FIG. 7     FIG. 8
INVENTOR:
IGNACIO L. RUIZ
BY *Peter L. Tailer*
AGENT

United States Patent Office 3,029,546
Patented Apr. 17, 1962

3,029,546
MULTI-PURPOSE FISH TRAP
Ignacio L. Ruiz, 208 E. 148th St., Bronx, N.Y.
Filed Apr. 5, 1960, Ser. No. 20,051
5 Claims. (Cl. 43—105)

This invention relates, in general, to fish traps and, more particularly, to folding fish traps.

An object of my invention is to provide a fish trap which can be collapsed for easy storage and transportation.

Another object of my invention is to provide a fish trap which, with the use of a few accessories and by making a few simple adjustments, may be used for a wide variety of purposes.

A further object of my invention is to provide a more easily used and a stronger folding frame structure which may be covered by netting to form a fish trap.

Many other objects, advantages and features of invention will become apparent from the following description and accompanying drawing wherein:

FIG. 1 is a perspective view of my invention assembled as a fish trap;

FIG. 2 is a perspective view showing a folding longitudinal member of the fish trap frame in an extended position attached to fragments of the upper and lower frame rings;

FIG. 3 is a perspective view of a folding longitudinal member of the fish trap frame shown in a collapsed position attached to fragments of the upper and lower fish trap frame rings;

FIG. 4 shows a modification of my invention wherein a fish trap entrance member of adjustable size is provided;

FIG. 5 is a perspective view of the net which is used with the fish trap attached to a handle to be used as a scoop net;

FIG. 6 is a perspective view of the net of the fish trap being used as a net for keeping live bait;

FIG. 7 is a section through two elements of my fish trap frame assembly joined by a band connector;

FIG. 8 is a section through two elements of my fish trap frame assembly joined by a band connector which has been crimped;

FIG. 9 is a side view of a modified trap entrance element;

FIG. 10 is an end view of the modified trap entrance element; and

FIG. 11 is a longitudinal section showing fragments of the ends of a single piece of wire joined to form a ring.

Referring to the drawings in detail, FIGS. 1, 2 and 3 show that my invention consists of a frame having an upper ring 20 which is joined to the larger lower ring 21 by means of the folding longitudinal members 22. Each folding longitudinal member 22 consists of a shorter arm 23 and a longer arm 24. Both ends of the arms 23 and 24 are bent in the same direction at 90 degrees. A 90 degree bend on the upper end of each shorter arm is disposed parallel to a portion of the upper ring 20 and attached to it by means of a band fastener 25 which may be formed from a short length of flattened tubing. Such a band fastener is shown in FIG. 7 and again in FIG. 8 after it has been crimped by forcing its sides inward to further tighten it.

Two 90 degree bends, one from each shorter arm and one from each longer arm, are also pivotally connected by a band fastener 26. In a like manner, the lower ends of the longer arms 24 are attached to the lower ring 21 with the band fasteners 27.

The ends 29 and 30 of the shorter and longer arms 23 and 24 which extend through the band fasteners 26 are bent at right angles to extend normal to the arms 23 and 24. A locking sleeve 32 fits over each pair of arm ends 29 and 30 to lock the longitudinal members 22 in the extended position as shown in FIG. 2. As shown in FIG. 1 and FIG. 2, the ends 33 of the short arms 23 are bent after they extend through the band fasteners 25 so that they extend downward at an angle from the upper ring 20 when the longitudinal members are in the extended position. The ends 34 of the longer arms 24 are also bent after they pass through the band fasteners 27 to extend downward at an angle as shown in FIG. 2. While the ends 33 and 34 are shown bent at less than right angles to the portions of the arms 23 and 24 which pass through the band fasteners 25 and 27, the ends 33 and 34 are best bent at right angles so that a single 90° setting of a wire bending die will enable the die to be used to fabricate the arms 23 and 24.

The fish trap is assembled in the following manner. The frame would normally be carried in and assembled from the collapsed position as shown in FIG. 3. The upper and lower rings would be urged apart so that the longitudinal members 22 would straighten out as shown in FIG. 2. A net 35, as shown in FIG. 6, has a large ring 36 secured within it. So that this ring may be removed from the net if it is considered desirable or moved in relation to it, it is formed of a single piece of wire the ends of which are brought together as shown in FIG. 11 and joined by forcing them into a collar 37. One end of the tubular net 35 is closed with a drawstring 42 while the other end of the net 35 has fixed in it the small ring 39. Short lines 40 extend from the ring 39 to attach the locking sleeves 32 to it.

When the frame has been raised into the position described, the ring 39 is passed through the ring 20 and a locking sleeve 32 is secured to each pair of the arm ends 29 and 30 to lock the longitudinal members 22 in extended positions. The net 35 is then drawn downward, or to the left as shown in FIG. 1, until the ring 36 passes over the rings 20 and 21. At this time the drawstring 42 may be tightened so that the fish trap assumes the appearance shown in FIG. 1. As the net 35 is passed over the rings 20 and 21, it may first be pulled taut and hooked over the ends 33 which project outward and in the direction in which the net is being stretched. In this position, the second drawstring 38 may be tightened to the desired degree to leave a suitable aperture for the entrance of fish of the size it is desired to trap. When the net is stretched beyond the ring 21, the ends 34 may be hooked into the net to hold it while the drawstring 38 is tightened. Thus these ends 33 and 34 perform a valuable function in that they greatly facilitate the passing of the net about the frame. In addition, the ends 34 bear against the outer side of the ring 21 when they are perpendicular to it. This prevents an individual arm 24 from being raised past the vertical position as shown in FIG. 2 and renders easier the erection of the frame.

If a suitable bait is then placed within the fish trap, fish will be selected according to size by the degree to which the drawstring 38 is tightened. If the trap is thus left overnight in the water to catch bait, it may be pulled out the next day assuring a plentiful supply. If it is desired to trap game or eating fish, certain states have very strict laws as to the size of the aperture through which the fish may enter a trap. For this reason as shown in FIG. 4, two U-shaped members 44 and 45 are slidably joined by two band fasteners 46. The net 35 and the lines 40 would then be attached to the U-shaped members 44 and 45 instead of being attached to the ring 39. Thus one dimension of the opening to the fish trap would be controlled while the other dimension would be adjustable as the U-shaped members 44 and 45 were moved together or pulled apart. In this manner, the size of the fish to be trapped may be selected while the opening to the fish trap conforms to specific laws.

As shown in FIG. 9 and FIG. 10 to form an eel trap, a cup 48 is fixed to a ring 49 to which the lines 40 are attached as well as the net 35. A suitable aperture 50 is formed in the end of the cup 48 and has extending from it the radial slots 51. Since the cup 48 is made of polyethylene or any other suitably flexible material, the slots 51 will allow the aperture 50 to expand allowing the entrance of an eel, while the aperture will tend to close when the eel attempts to escape outwardly or downwardly as shown in FIG. 9.

As shown in FIG. 6, the net 35 with the large ring 36 within it to keep it from collapsing upon itself may be hung in the water to provide a suitable place to keep alive bait or fish that are caught. If the drawstring 42 is opened all the way and the ring 36 is placed at that end of the net 35, then the drawstring 38 may be pulled tight to close the other end of the net 35. In this position as shown in FIG. 5, a special attachment may be added which will convert the net 35 into a scoop net. The attachment consists of a short handle 52 from which the two side supports 53 and 54 extend. These side supports may be inserted in band fasteners 55 on ring 36. At the same time a snap fastener 56 may be forced about the ring 36 to securely fix it to the handle 52. Then, by means of the handle 52, the net may be used as a scoop net or a landing net.

Referring now to FIG. 1, if the drawstring 38 is tightened and the drawstring 42 is loosened all the way, the fish trap may be placed with bait in it in shallow water and as soon as fish are seen to enter it they may be instantly trapped by pulling on the drawstring 42 to close the trap and pull it from the water. The locking sleeves 32 are similar to the band fasteners which are shown in section as shown in FIG. 7 or FIG. 8. However, they are slightly longer and are pinched together at their rearmost ends 57 where a small aperture may be drilled through which the lines 40 may be attached. Naturally, obvious mechanical equivalents may be substituted for the band fasteners 25, 26 and 27 so that the band fasteners may be positioned on the frame assembly after the arms 23 and 24 have been bent or after the rings 20 and 21 have been formed by having their ends joined in a sleeve 37 similar to that shown in FIG. 11.

While I have disclosed my invention in the best form known to me, it will nevertheless be understood that this is purely exemplary and that modifications in its construction and arrangement of parts may be made without departing from the spirit and scope of the invention except as it may be more limited in the appended claims wherein I claim:

1. A fish trap comprising, in combination, a first ring, a second ring, a first set of arms having upper and lower portions bent at right angles and extending parallel to each other, the lower portions having ends bent at an angle to the lower portions and projecting downward, the upper portions having ends bent at right angles to the upper portions and projecting perpendicular to a plane passing through said first set of arms and the upper portions of said first set of arms, a second set of arms having upper and lower portions bent at right angles and extending parallel to each other, the lower portions having ends bent at right angles to the lower portions and projecting perpendicular to a plane passing through said second set of arms and the lower portions of said second set of arms, the upper ends having ends bent at an angle to the upper portions and projecting downward, means pivotally attaching the lower portions of said first set of arms to said first ring, means pivotally attaching the upper portions of said second set of arms to said second ring, means pivotally attaching the upper portions of said first set of arms to the lower portions of said second set of arms so that said arms may be pivoted from adjacent to extended positions, a tubular net with a constriction at one end, short lines fixed to the constriction in said net, locking sleeves attached by said short lines so that said locking sleeves may be slipped over the ends of the upper portions of said first set of arms and the ends of the lower portions of said second set of arms when said arms are in an extended position, said locking sleeves securing the arms in an extended position and securing the constriction in said tubular net by means of said short lines between said first and second rings when said net is drawn over said rings and said arms, and means to close the end of said net opposite the constriction in said net.

2. The combination according to claim 1 with the addition of a third smaller ring fixed at one end of said net forming the constriction in said net and with the addition of an adjustable drawstring forming a further constriction in said net adjacent to said third smaller ring.

3. The combination according to claim 2 with the addition of a fourth ring larger than said first and second rings fixed within said net toward the end disposed away from the third smaller ring fixed in said net.

4. The combination according to claim 1 wherein the constriction in said net is formed by a first U-shaped member, a second U-shaped member, means slidably securing said U-shaped members one upon the other disposed in opposite directions, said U-shaped members being fixed in one end of said net.

5. The combination according to claim 1 with the addition of a flexible inwardly extending cup in the constriction of said net, said cup containing a central aperture having radial slits extending from said central aperture.

References Cited in the file of this patent

UNITED STATES PATENTS

| | | |
|---|---|---|
| 535,966 | Tufts | Mar. 19, 1895 |
| 885,311 | Akerman | Apr. 21, 1908 |
| 1,193,816 | Ottmann | Aug. 8, 1916 |
| 1,407,744 | Ftyklo | Feb. 28, 1922 |
| 1,985,177 | Lawrence | Dec. 18, 1934 |